Jan. 30, 1962 R. KIMES 3,018,790
RESPIRATION APPARATUS
Filed June 18, 1956 2 Sheets-Sheet 1
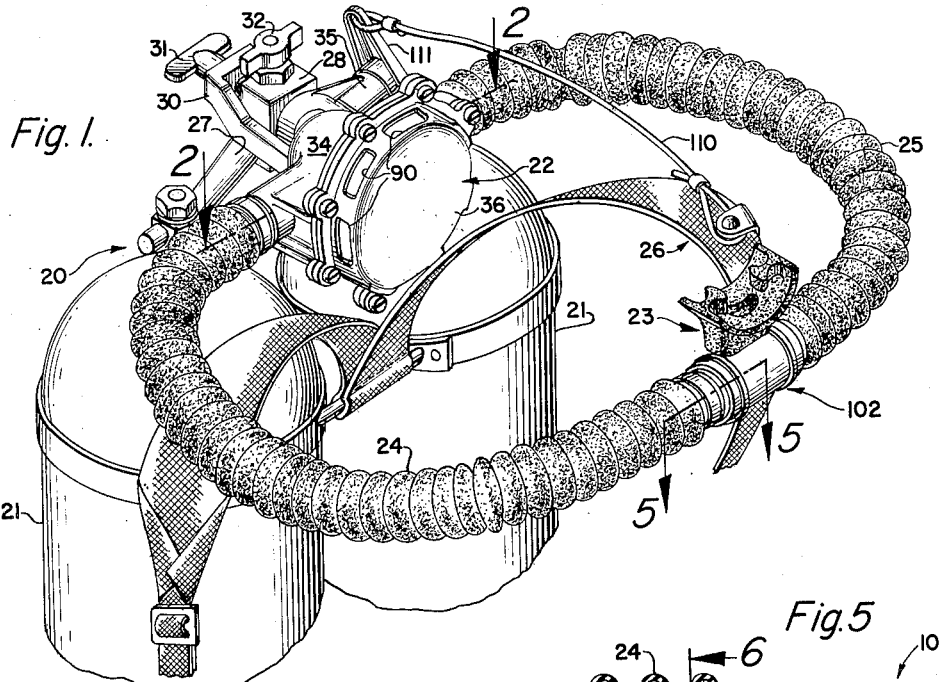
ROBERT KIMES,
INVENTOR.
BY John H. J. Wallace Jan. 30, 1962   R. KIMES   3,018,790
RESPIRATION APPARATUS
Filed June 18, 1956   2 Sheets-Sheet 2
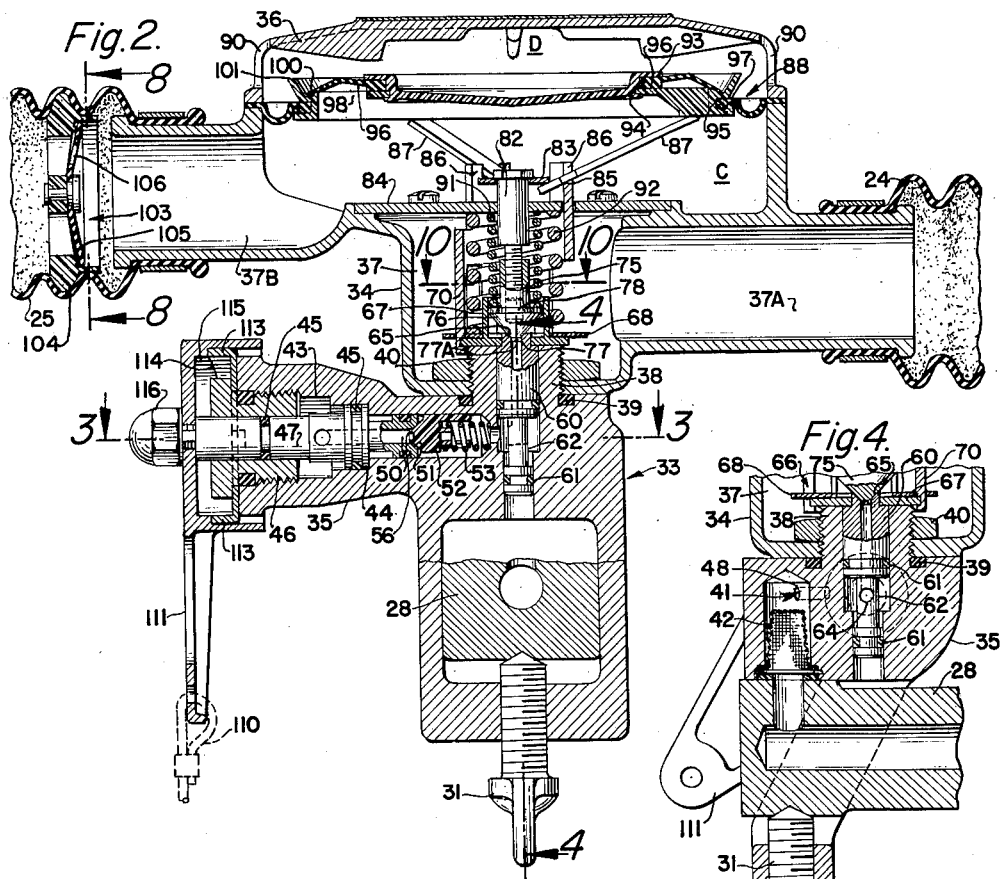
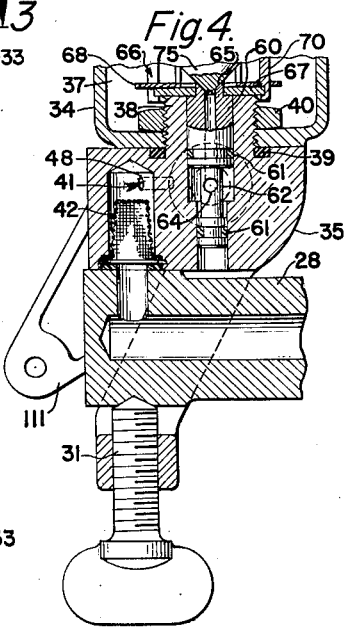
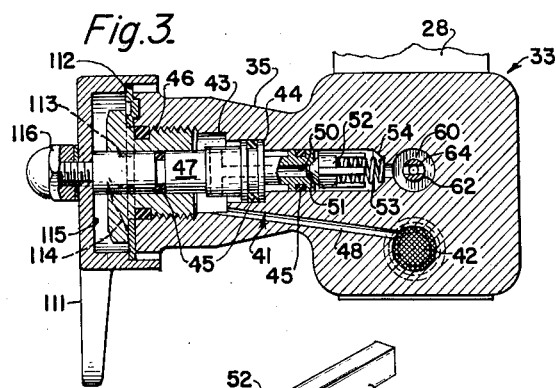
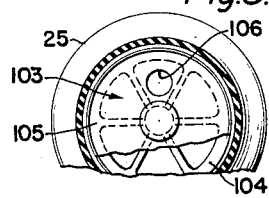
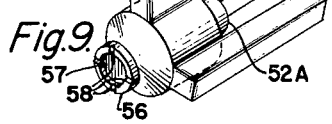
ROBERT KIMES,
INVENTOR.
BY John H.J. Wallace

United States Patent Office 3,018,790
Patented Jan. 30, 1962

3,018,790
RESPIRATION APPARATUS
Robert Kimes, Culver City, Calif., assignor to The Garrett Corporation, Los Angeles, Calif., a corporation of California
Filed June 18, 1956, Ser. No. 591,914
1 Claim. (Cl. 137—454.6)

This invention relates generally to respiration devices. It is more particularly directed to the type of such devices shown in the co-pending applications of Kimes et al., Serial No. 378,856, filed September 8, 1953, now Patent No. 2,855,923, and Kimes, Serial No. 427,195, filed May 3, 1954, now Patent No. 2,828,739, the constructions shown herein being improvements over those in the earlier filed applications.

In the co-pending applications, breathing apparatuses are provided for delivering controlled quantities of breathable gas in response to respiration induced changes in pressure within the devices, the gas being delivered at a pressure suitable for use in the lungs of a human being when surrounded by fluids which are either not breathable or dangerously toxic. These devices are provided with diaphragm means which are responsive to differences in pressures internally and externally of the devices to operate valves for controlling the admission of a breathable gas from a source to a chamber from which it may be drawn by the user. The devices also include valve means for controlling the discharge of exhaled gases from the devices to the surrounding medium. Each of the prior devices further includes safety mechanisms by which the user is apprised of the approaching exhaustion of the supply of breathable gas and through the manipulation of a control may make available a reserve supply of such gas sufficient to enable the user to return to a safe place.

An object of this invention is to provide respiration apparatus having improved diaphragm and valve constructions which facilitate the fabrication of the devices through the elimination of hand operations and the use of special skills in their assembly. The improvements also enhance the operation and use of the devices by reducing the breathing resistance and increasing the safety factor.

Another object of the invention is to provide a submarine breathing device having a novel diaphragm construction which embodies a substantially rigid platelike body and a flexible diaphragm ring, the body having a plurality of exhaust gas outlets and a flexible ringlike valve overlapping the openings to permit the escape of exhalation products and prevent the entrance of surrounding fluid, this construction serving to locate the exhalation openings as close to the outer periphery as possible to increase the ease with which the device may be purged of water if and when any should gain access thereto. As in well-known to users of such devices, the mask or mouthpiece may be accidentally or purposely dislodged and water enter the hoses or other parts. With the present construction such water may be readily and completely expelled without undue effort on the part of the user.

A further object of the invention is to provide an improved diaphragm for breathing apparatus of the type mentioned in the preceding paragraphs, the diaphragm having a disklike body preferably formed of some suitable plastic material such as nylon, and having a peripheral groove for receiving and holding the inner edge of a ringlike flexible diaphragm, the outer edge thereof being clamped between separable parts of the casing of the apparatus so that the disklike body may move back and forth in response to fluid pressure differentials at opposite sides thereof, the body having a series of holes extending therethrough adjacent the peripheral groove and another groove for receiving and holding the inner edge of a ringlike flexible valve element so that it extends over the holes and engages the surface of the body around the holes, the valve permitting the flow of exhaled gases through the holes, but preventing the entrance of fluid thereinto.

A still further object of the invention is to provide an improved metering valve construction for breathing apparatus of the type referred to above, the valve being so formed that it may be quickly and easily assembled without special tools and adjusted after assembly to secure the desired relation to other elements.

Another object is to provide a metering valve construction for breathing apparatus, such construction embodying a floating valve seat, similar to that shown in the copending application, Serial No. 427,195, previously mentioned, with means for restraining part of the valve means against certain movement so that adjustment of another part will effect a change in important dimensions and relations of parts to secure desirable operational characteristics.

Other objects and advantages of the invention will become apparent from the following description of the embodiment of the invention illustrated in detail in the accompanying drawings.

In the drawings:

FIGURE 1 is a perspective view of respiration apparatus embodying the principles of the present invention;

FIGURE 2 is an axial sectional view taken through a regulator mechanism forming a part of the respiration apparatus shown in FIG. 1, the plane of the section being indicated by the line 2—2 of FIG. 1;

FIGURE 3 is a transverse sectional view taken through a valve and associated mechanism employed in the regulator shown in FIG. 2, to reserve a portion of the breathable gas supply, the plane of the section being indicated by line 3—3 of FIG. 2;

FIGURE 4 is a detailed axial sectional view taken through the regulator on the plane indicated by the line 4—4 of FIG. 2;

FIGURE 5 is an axial sectional view taken through the inhalation hose and mouthpiece on the plane indicated by the line 5—5 of FIG. 1;

FIGURE 6 is a detailed transverse sectional view on the plane indicated by the line 6—6 of FIG. 5;

FIGURE 7 is a perspective view of parts of the mechanism employed in the regulator to make the reserve supply of breathable gas available, the parts being shown separated to facilitate an understanding of the construction and operation;

FIGURE 8 is a detailed transverse sectional view taken on the plane indicated by the line 8—8 of FIG. 2;

FIGURE 9 is a perspective view of a valve element used in the regulator to resist the flow of breathable gas from the source to the regulator and to signify to the user that the supply is approaching exhaustion; and FIGURE 10 is a detailed horizontal sectional view taken on the plane indicated by the line 10—10 of FIG. 2.

Referring more particularly to the drawings, the respiration apparatus to which the invention is applied is shown generally in FIG. 1 and is designated by the numeral 20. This apparatus, in the form of the invention illustrated, includes a supply of breathable gas, in this instance a tank or pair of tanks 21 for holding compressed breathable gas, a regulator 22, a mouthpiece 23, and a plurality of hoses 24 and 25 connecting the mouthpiece with the regulator. The apparatus also includes suitable harness means 26 by which it is supported on the body of the user. The outlets of tanks 21 communicate with a manifold 27 having an outlet fitting 28 which is positioned in a yoke 30 formed with the regulator 22 and employed to secure these elements in assembled relationship, a thumb screw 31 being threaded into the yoke to urge the fitting 28 into leakproof engagement with the regulator. The fitting 28 includes a shutoff valve 32 by which the flow of gas from the tanks 21 to the regulator may be initiated prior to use of the apparatus and interrupted following such use.

The regulator 22 of FIG. 1, as shown in FIG. 2, includes a body designated generally by the numeral 33 and having three major parts, 34, 35, and 36, these parts being secured together to form a unitary element. The main parts of the regulator are contained within parts 34 and 36 while part 35 contains a breathing gas reserve control valve. The body part 34 forms a chamber 37 into which a projection 38 on body part 35 is inserted through an opening in a wall of the part 34, a nut 40 being threaded onto the projection to retain these parts in proper relative positions. A sealing ring 39 is disposed between parts 34 and 35 to prevent leakage at this point.

Part 35 is formed with a series of drilled openings to provide a passage, designated generally by numeral 41, communicating at one end with the fitting 28 to receive breathable gas from the tanks 21 and at the other with the chamber 37. At the end of the passage communicating with fitting 28, a foraminous filter 42 is inserted to prevent the entrance of foreign material into the regulator. A portion of the gas passage 41 in body part 35 includes a stepped bore 43 which is drilled into the body part 35 and in which a valve seat insert 44 is movably disposed, suitable seals 45 being provided to prevent gas seepage between the insert and the walls of the bore. The enlarged open end of the bore 43 is threaded to receive a plug 46 which closes the end of the bore, such plug having a central opening through which an extension 47 on the insert projects. The plug 46 terminates short of the inner end of the enlarged portion of the bore to provide a gas space and a portion 48 of the passage 41 extends from the inlet end thereof containing the filter, to the gas space at the inner end of the plug 46. The breathable gas admitted from the supply through the passage section 48 to such gas space is applied to an outwardly facing differential area on the insert to tend to urge it into the bore. The purpose of this construction will be made apparent hereinafter.

The insert 44 is drilled as at 50 to permit the breathable gas to flow longitudinally through the insert to the space at the inner end of the insert. This end of the insert is provided with a valve seat 51 for engagement by a poppet type valve 52 which is urged toward the seat by a coil spring 53 frictionally held on a boss 52A on the valve and positioned between the valve and a shoulder 54 at the inner end of the bore 43. It will be noted at this time that due to the force of the gas at source pressure applied to the outwardly facing differential area on the insert 44, spring 53 is compressed and caused to urge the valve 52 toward the seat 51 with a predetermined force which creates a certain pressure drop on the gas flowing past valve 52. This pressure drop fixes the volume of breathable gas conserved to constitute a positive reserve supply. It will be apparent that since the spring force is substantially constant the pressure drop caused by the valve 52 will remain the same, therefore, the volume of gas reserved will be directly proportional to the hydrostatic pressure. In other words, a greater reserve will be held back when the apparatus is used at a greater depth.

Poppet valve 52 is preferably formed of a plastic material, such as nylon, and, as shown in FIG. 9, has a plurality of prongs 55 projecting in a longitudinal direction therefrom, these prongs slidably engaging the side wall of the bore 43 and guiding the valve in its movement toward and away from the seat 51.

As shown in FIG. 9, poppet valve 52 has a small extension 56 on the tip which enters the drilled opening 50 during the valving operation; this projection is bored centrally, as at 57, to give it a tubular form and to lend a slight resilience to the projection, the outer diameter of the projection being substantially equal to or slightly larger than the internal diameter of the bore to effect a plug type seal. In the form of valve illustrated, the wall of the tubular projection has small V-shaped notches 58 formed therein which extend approximately one-half the length of the projection and serve, when the valve moves in an opening direction, to initiate and progressively increase flow through the valve. The particular valve construction has been selected for use in the apparatus because it has little or no tendency to vibrate and cause objectionable noise or other irregular operation.

The portion of the part 35 which projects into the chamber 37 is bored to receive a floating valve seat insert 60 which is similar in construction and operation to a corresponding part in application, Serial No. 427,195, referred to above. This insert is of generally cylindrical shape, having longitudinally spaced grooves for receiving sealing members 61, and a relieved portion 62 between the grooves which portion 62 communicates with the gas inlet passage 41 formed in part 35. The diameters of the portions of insert 60 at the opposite ends of the relieved portion 62 are made unequal to provide a differential area to be exposed to the incoming gas which tends to move the insert 60 toward the chamber 37. The tendency is utilized in a manner to be hereinafter set forth. The insert 60 also has a transverse port and an axial bore connecting therewith to form a passage 64 leading from the relieved portion 62 to the chamber 37, the outlet end of this passage being provided with a valve seat 65. The floating valve seat insert 60 is part of an assembly, designated generally by the numeral 66, including an end piece 67 pressed onto insert 60, a lockplate 68 and a tube 70, these parts being separately formed and assembled prior to insertion in the regulator. The tube 70 may be formed of any suitable material and is provided at its lower end with spaced fingers 71 each having a transversely extending recess on the inner side. These recesses are formed to receive the edge of the end piece 67 and are retained in assembled relation therewith by the lockplate 68 which has slots 72 for receiving the fingers 71. During assembly of these parts, the lockplate 68 is slipped over the fingers 71 and moved to the upper end thereof, then the ends of the fingers are snapped over the edge of the end piece 67 after which the lockplate 68 is moved downwardly into engagement with the upper surface of end piece 67. The fingers are thus retained against outward movement and prevent the release of end piece 67. Relative rotary movement of the tube 70 and end piece 67 is prevented by the engagement of sides of an oval shaped central opening 73 in the lockplate with spaced projections 74 extending upwardly from the end piece 67. This construction facilitates the assembly of the device by eliminating soldering, welding or other operations heretofore employed. The spaced projections 74 on end piece 67 are also provided to guide a metering valve element 75 in its movement toward and away from the seat on the insert.

Valve element 75 is also preferably formed of a plastic material, such as nylon, and includes a head 76 with a projection 77 on the end, which projection is adapted to enter the central opening in the seat insert. This projection 77 is also bored centrally to give it a tubular form and lend flexibility to the projection to secure a better sealing engagement with the side of the inlet opening in the insert. Projection 77 is also formed with V-shaped notches 77A which serve to initiate gas flow as the valve 75 moves in an opening direction and then progressively increase such flow as opening movement continues. Here again the particular valve construction is employed to prevent vibration of the valve and faulty operation resulting therefrom. Improved gas flow results from the use of the valve shown. As shown in FIG. 10, the head 76 of valve 75 includes oppositely projecting portions 78 which are disposed in the spaces between the projections 74 on the end piece 67 to prevent rotation of the valve element 75. This valve element is provided with a stem 80 having a threaded opening 81 formed therein to receive a bolt 82, the latter serving to retain a washer 83 in position to provide a shoulder on the valve element. The purpose of the shoulder will be apparent from the following description.

Part 34 of the body has a partition 84 secured therein which divides the chamber 37 into inlet and exhaust sections, 37A and 37B, respectively, the partition having a plurality of guide openings formed therein, one for the bolt 82 which is threaded into the stem of valve 75, and the others for projections 85 forming a part of tube 70. The ends of the projections 85 extending into exhaust section 37B of the chamber 37 are notched as at 86 to receive actuating levers 87, each having one end disposed under the washer 83 and the other end extending toward the body part or cover 36.

The exhaust section 37B of the chamber is also divided into sections C and D by a diaphragm assembly designated generally by the numeral 88, this diaphragm assembly being exposed on one side to gas pressure in the section C of the chamber 37 and on the other side to the pressure of a fluid medium surrounding the regulator and flowing into the cover 36 through openings 90 formed therein. Differentials in pressures of these fluids will cause the diaphragm assembly 88 to move inwardly or outwardly depending upon variations in such differentials. When the diaphragm moves inwardly into the section C of chamber 37, it will engage the ends of the levers 87 projecting toward the diaphragm and cause the levers to rock about the projections 85, the inner ends of the levers moving toward the diaphragm and transmitting a similar motion to the valve element 75 through the washer 83 and bolt 82 carried by such valve element. This movement of the valve element withdraws it from the seat 65 in the insert and permits the breathable gas to flow into the inlet section of the chamber. Such motion of the valve is yieldably resisted by a coil spring 91 surrounding the valve and the bolt and engaging the partition at one end and the valve head at the other. Outward movement of the diaphragm permits the spring to move the valve toward the insert to reduce or interrupt gas flow into the chamber.

A second spring 92 surrounds the valve element. This spring has one end in engagement with the partition 84 and the other end in engagement with the lock-plate 68, this spring tending to move the valve seat insert 60 into the bore in the projection 38 in opposition to the force of the gas pressure applied to the differential area on the valve seat insert 60. The bore for receiving the floating valve seat insert 60 extends through part 35, as shown in FIG. 4, and thus exposes one end of the insert to the pressure of the fluid surounding the regulator. Since the pressure within the chamber 37 of the regulator is substantially equal to the pressure of the surrounding fluid, the forces at the ends of the insert 60 are substantially balanced except that force applied by inlet gas pressure on the differential area of the insert 60. This last-mentioned force is important in that it is employed to shift the metering valve assembly and thus compensate for the variations in inlet gas pressure which take place as the gas supply is consumed. It will be obvious that inlet gas pressure applied to the projection 77 on valve 75 tends to move the valve toward an open position. When the source pressure is high more force will be exerted than when source pressure is low. By applying source pressure to the differential area of the insert 60, the latter is caused to move toward the partition 84 in opposition to the force of spring 92 when source pressure is high. This movement causes a compression and consequent increase in force of the valve spring 91 which counteracts the force of the incoming gas applied to the projection 77 and a force of predetermined magnitude applied through levers 87 will open the valve 75. As the gas supply diminishes, through use or otherwise, spring 92 moves the insert back into its bore and this movement relaxes spring 91 in proportion to the reduction in gas pressure so that the magnitude of force required to be applied through levers 87 to open valve 75 will remain the same whether the gas supply is at a maximum or almost depleted.

It will be seen from FIG. 2 that adjustment of bolt 82 in valve 75 may be accomplished through the rotation of the head of the bolt, the valve head and stem being retained against rotation by the interengagement of the projections 78 and 74. This adjustment varies the distance between the shoulder formed by washer 83 and the seat engaging portion of the valve and consequently varies the relation of the shoulder and the fulcrum points of levers 87. The points in the movement of the diaphragm assembly at which the levers 87 are engaged and the valve opened will thus be set.

One of the features of this invention resides in the construction of the diaphragm assembly 88. This assembly includes a disklike plate 93 preferably formed of a plastic material, such as nylon, the disk having inner and outer outwardly facing grooves 94 and 95, respectively, which constitute receptacles for the reinforced inner edges of ringlike flexible elements 96 and 97, respectively. One of these elements, designated by numeral 97, constitutes the flexible part of the diaphragm assembly and has its outer edge portion formed to be received and clamped between the body part 34 and cover 36. The transverse length of the diaphragm element 97 is greater than the actual distance between the inner and outer edge portions, this excess of material increasing the flexibility of the element and the potential movement of the operating part of the diaphragm assembly. The diaphragm may be formed of rubber or similar material well-known in the art. Between the inner and outer grooves, the plate 93 is formed with a series of openings 98 extending through the plate, an annular valve seat 100 extending around the outer side of the openings on one face of the plate. Beyond the seat, the plate has a flange 101 projecting upwardly therefrom.

The ringlike element 96 secured in the inner groove 94 projects over the openings 98 and serves as a flap valve, the outer edge of this element being disposed to engage the seat 100 and prevent the entrance of fluid, which surrounds the regulator, into the regulator through the openings in the plate. As illustrated in the drawings, the flap valve element 96 is formed with a slight annular crease at the intermediate portion to cause the element to have line contact with the seat and increase the inherent tendency of the flap valve to move to a closed position. The flange 101 is provided to prevent water which may move back and forth within the cover 36 from raising the edge of the flap valve 96.

It will be obvious that when the fluid pressure in the section C of the chamber exceeds that of the surrounding fluid medium and the diaphragm assembly has moved outwardly a predetermined distance under the influence of such pressure, the outer edge of the flexible valve element 96 will be raised from the seat 100 to permit the escape of the fluid causing the excess pressure. When the user of the apparatus occupies a normal upright position, the regulator is disposed with the plane of the diaphragm assembly substantially vertical. When so disposed, some of the openings 98 in the diaphragm assembly will be at a level below the lowermost openings in partition 84. This arrangement is desirable since it permits water or other fluid entering the regulator to escape therefrom before the water level reaches the openings in the partition 84 through which the projections on tube 70 extend. This water, or other fluid, will be forced out by gas pressure within the exhaust section of the chamber when the user of the device exhales. Due to the relatively large diameter of the diaphragm and the exhalation valve 96, these elements will be exposed on the exterior side to hydrostatic pressure which varies between the upper and lower edges, the effective pressure being the average of the different pressures or the pressure which is applied at the center of the diaphragm assembly. Such average pressure will be substantially maintained in the regulator and the force of a column of water of a predetermined height will be required to move the diaphragm against this pressure to admit breathable gas from the source. The inherent resistance to opening movement of the exhalation valve must slightly exceed the average pressure or the force of such column of fluid to prevent the escape of unused breathable gas from the apparatus.

As illustrated in FIG. 1, and mentioned previously, the respiration apparatus includes a plurality of flexible hoses 24 and 25, the former constituting the inhalation hose and the latter the exhalation hose. These hoses connect with the regulator casing and extend to opposite ends of a mouthpiece 102, the latter being of a type illustrated in the co-pending application of Kimes, Serial No. 482,692, filed January 19, 1955, entitled "Oxygen Supply Breathing Apparatus."

As illustrated in FIG. 2, the inhalation hose communicates with the inlet section 37A of the chamber 37 and receives gas admitted thereto. Gas is drawn through the inhalation hose by the user and flows through the mouthpiece which is provided with a tubular portion held in the user's mouth during use of the apparatus. When the spent gas is exhaled it flows through the exhalation hose 25 to the outlet section 37B of the chamber 37 and moves the diaphragm assembly outwardly until plate 93 engages lugs on the inner side of the cover. Then, as previously mentioned, this exhaled gas will flow through the openings 98 in the diaphragm plate 93 and past the valve 96 to the surrounding fluid medium. When the user inhales, the pressure in section 37B is reduced and the diaphragm assembly will move into such section under the force of the fluid surrounding the regulator. This movement of the diaphragm depresses the levers as previously described and moves the metering valve to an open position to admit more breathable gas.

The rate at which the diaphragm moves into the chamber in response to the inhalation is restricted by a breathing control valve 103 disposed in the exhalation hose 25 adjacent its point of attachment to the regulator body. This breathing control valve includes a circular valve seat element 104 which has radiating ribs which are spaced to provide a plurality of openings, the disk having a flexible disk flap valve 105 connected at its center to the outlet side of the seat element and arranged to close the openings therein and restrict reverse flow through the hose. The valve has a restricted opening 106 formed therein through which gas may be drawn from chamber section 37B during initial inhalation by the user to cause the diaphragm to be depressed and open the metering valve 75. Since the opening 106 is restricted, the reduction in pressure in the section 37B of the chamber will occur at a controlled rate and the dynamic overtravel of the diaphragm will be prevented. It should be apparent that during exhalation the edge of the check valve 105 is free to swing away from the seat element 104 and will offer a minimum of resistance to the flow of exhaled air.

In some instances, the mouthpiece may be either accidentally or intentionally removed from the user's mouth. When this action takes place, water may flow into the mouthpiece. Entrance of this water into the inhalation hose is prevented by a check valve 107 disposed in such hose adjacent its point of attachment to the mouthpiece. This check valve is similar in construction to the breathing control valve 103, but the flexible disk flap valve 108 thereof is imperforate so that reverse fluid flow through the inhalation hose will be prevented. Water will thus be prevented from flowing from the mouthpiece into the inhalation hose.

As pointed out in the objects, the respiration apparatus is provided with means including valve 52 and insert 44 for resisting the flow of breathable gas from the tanks 21 into the regulator to create a reserve supply which may be made available by the operator when he recognizes that the normal supply is depleted. He will become apprised of this fact when breathing resistance increases due to the failure of the supply. At this time, the operator may pull a cord 110 which is attached to one end of a lever 111 and cause the lever to swing to a position wherein the reserve supply is made available.

As illustrated in FIG. 7, a cam follower 112 is secured in a non-rotatable condition to the body part 35 by the plug 46, projections 113 on the cam follower being disposed for engagement with cam surfaces 114 formed in the cap-like body 115 of the lever 111. This lever is secured to the end of the outwardly projecting extension 47 of the valve seat insert 44 by an acorn nut 116. As the lever is moved by the operator, the cam surfaces 114 riding on the projections 113 of the follower will move the insert 44 outwardly in opposition to the force exerted by gas pressure on the outwardly facing differential area of insert 44. This movement withdraws the seat 51 away from the valve 52 and unloads the spring 53, thus rendering the valve inoperative. The reserve supply of breathable gas may then flow without resistance to the metering valve. When the user operates the lever, he knows that sufficient breathable gas remains to permit him to reach a safe place.

As previously pointed out, the reserve supply is depth compensated, therefore, such reserve will always be sufficient to enable the user to reach the surface with safety.

I claim:

A diaphragm assembly for breathing apparatus comprising: a substantially rigid disklike plate having concentrically spaced inner and outer annular holding means and a plurality of openings extending through the plate between said holding means; an annular valve seating surface on said plate at the outer side of said openings; an annular flange surrounding said seating surface and extending outwardly and upwardly from said surface; a first resilient annular member having its inner edge portion arranged to be received and retained in said inner annular holding means, said first annular member extending over said openings and engaging said seating surface; and a second resilient annular member having its inner edge portion arranged to be received and retained in said outer annular holding means, the peripheral portion of said second annular member being formed for clamping engagement by separable parts of a housing structure, the intermediate portion of said second annular member having a transverse length in excess of the actual distance between said peripheral and inner edge portions.

(References on following page)

References Cited in the file of this patent

UNITED STATES PATENTS

| | | | |
|---|---|---|---|
| 527,902 | Taafel | Oct. 23, | 1894 |
| 676,855 | Shoemaker | June 18, | 1901 |
| 1,237,922 | Lucas | Aug. 21, | 1917 |
| 2,090,512 | Ernst | Aug. 11, | 1937 |
| 2,357,318 | Donaldson | Sept. 5, | 1944 |
| 2,445,359 | Meidenbauer | July 20, | 1948 |
| 2,657,701 | Hupp | Nov. 3, | 1953 |
| 2,695,609 | Nourse | Nov. 30, | 1954 |
| 2,764,151 | Cupp | Sept. 25, | 1956 |
| 2,820,469 | Seeler | Jan. 21, | 1958 |
| 2,823,670 | Page | Feb. 18, | 1958 |
| 2,873,754 | Dunaway | Feb. 17, | 1959 |
| 2,947,313 | Taylor | Aug. 2, | 1960 |

FOREIGN PATENTS

| | | | |
|---|---|---|---|
| 1,048,542 | France | Aug. 5, | 1953 |
| 207,994 | Australia | Apr. 26, | 1956 |